Patented Nov. 3, 1936

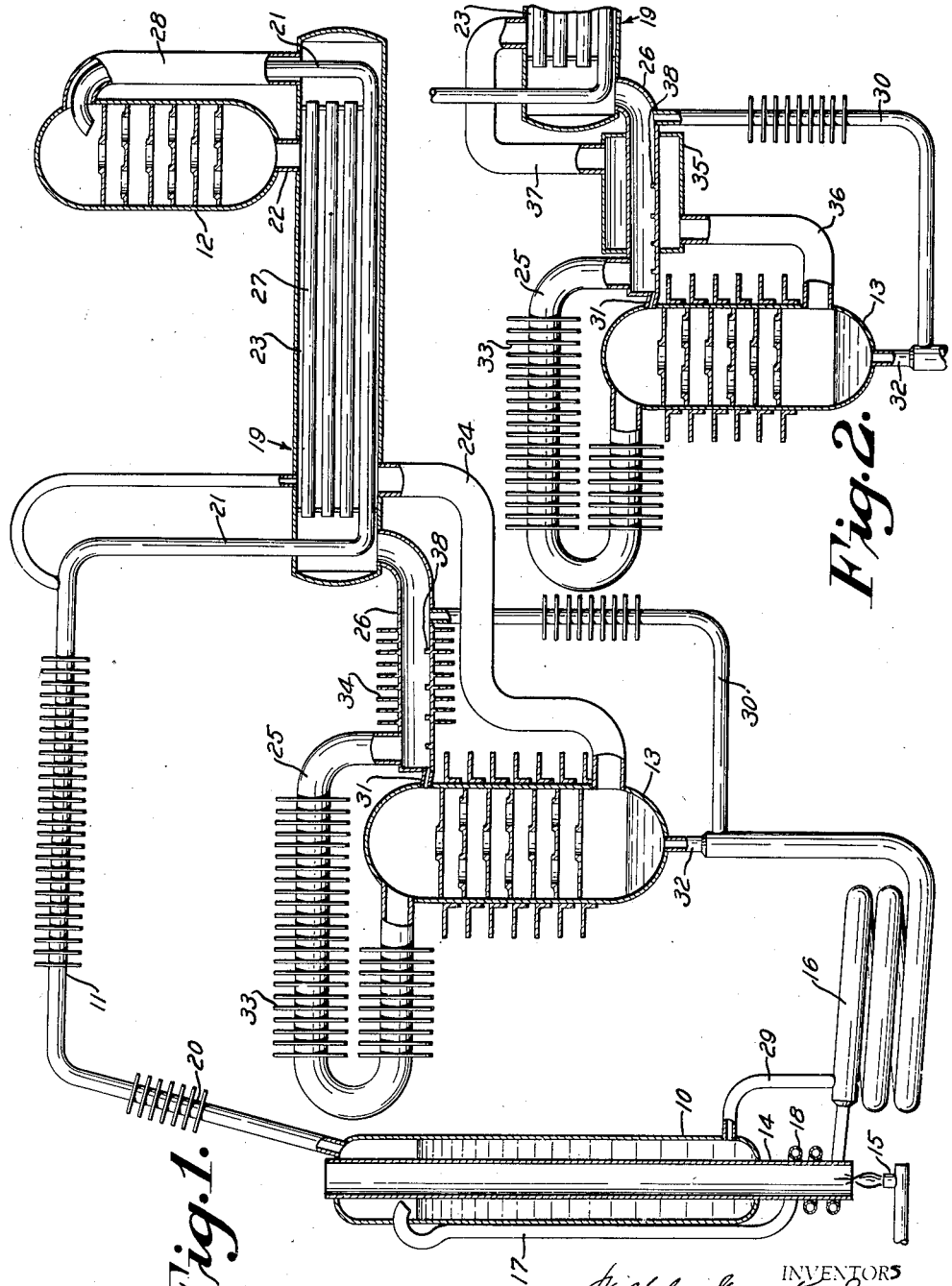

2,059,876

UNITED STATES PATENT OFFICE 2,059,876

REFRIGERATION

Wilhelm Georg Kögel and Nils Erik Widell, Stockholm, Sweden, assignors, by mesne assignments, to Servel, Inc., Dover, Del., a corporation of Delaware Application July 2, 1934, Serial No. 733,484
In Germany July 3, 1933

16 Claims. (Cl. 62—119.5)

Our invention relates to refrigeration and more particularly to improvements in a system for producing refrigeration by evaporation of refrigerant fluid in the presence of an auxiliary inert gas.

Briefly, in a refrigeration system of this type, inert gas is circulated between an evaporator and an absorber, and absorption liquid is circulated between the absorber and a generator or boiler. Refrigerant fluid is distilled from solution in the absorption liquid in the generator, and the liquid distillate is evaporated into the inert gas in the evaporator, producing the cooling or refrigerating effect. In the absorber the refrigerant is absorbed out of the gas into the absorption liquid.

It is an object of our invention to provide a refrigeration system of this type having increased efficiency.

Another object is to provide a system of this type which is cooled by air and has a high efficiency.

We accomplish these objects, in accordance with our invention, by first cooling the gas leaving the absorber and then bringing the cooled gas in contact with absorption liquid in its path of flow to the absorber. The gas is preferably cooled by heat transfer to air, and the gas and liquid contact is preferably carried out in counterflow relation. In its broad aspects, our invention resides in carrying out the absorption in a plurality of stages, with cooling of the gas between each stage.

Our invention, together with the objects and advantages thereof, will be more fully understood from consideration of the following description and the accompanying sheet of drawing forming a part of this specification, and of which:

Fig. 1 shows schematically an absorption refrigeration system of the pressure equalized type embodying our invention; and Fig. 2 is a partial view of the refrigeration system illustrating a modified system embodying our invention.

Referring to Fig. 1, the refrigeration system includes a generator or boiler 10, a condenser 11, an evaporator or cooling element 12, and an absorber 13. The generator 10 comprises an upright vessel which may be heated in any suitable manner, as for instance, by a gas burner 15 arranged so that the burner flame projects into the lower end of a heating flue 14. The condenser 11 and the absorber 13 are provided, as shown, with heat radiation fins for direct cooling by air. It will be understood, however, that either or both of these elements may be cooled in any desired manner as, for instance, by a secondary or intermediate heat transfer system, as known per se in the art. The generator 10 and the absorber 13 are interconnected by conduits, in part forming a liquid heat exchanger 16, for circulation therebetween of absorption liquid, as hereinafter described, the circulation being created by a thermosyphon conduit 17 having its lower end 18 formed as a coil around the lower end of the heating flue 14 in thermal transfer relation therewith. The absorber 13 and the evaporator 12 are interconnected through a gas heat exchanger 19 for circulation therebetween of a pressure equalizing gas as hereinafter described. The upper part of the generator 10 is connected to the condenser 11 by a conduit 20, and the condenser 11 is connected to the evaporator 12 by a conduit 21, which latter is formed with a downward loop and extends through the gas heat exchanger 19.

The system is charged with a suitable solution of refrigerant in an absorption liquid, such as a water solution of ammonia, and an inert pressure equalizing gas, such as hydrogen. These fluids may be introduced into the system through a suitable charging device, not shown, on the absorber 13. The hydrogen is admitted into the system at a pressure corresponding to the condensing pressure of the ammonia at a predetermined temperature which, in the case of air cooling, is preferably a high room temperature.

In operation, ammonia vapor is expelled from solution by heating in the generator 10 and flows through the conduit 20 to the condenser 11. In the latter, the ammonia is condensed to liquid which flows through conduit 21 into the evaporator 12. In the evaporator, which is in heat transfer relation with the body to be cooled, the liquid ammonia evaporates and the vapor diffuses into the hydrogen. The resulting gas mixture flows from the lower part of the evaporator 12 through a conduit 22, the outer passage 23 of the gas heat exchanger 19, and a conduit 24 into the lower part of the absorber 13. In the latter, ammonia is absorbed out of the gas mixture by weak absorption solution. The resulting weak gas flows through a conduit 25, a conduit 26, the inner passage 27, which may be made up, in part, as shown, of a number of tubes, of the gas heat exchanger 19, and a conduit 28 back to the upper part of the evaporator 12, thus completing the gas circuit.

Weak absorption solution, from which ammonia has been expelled in the generator 10, flows from the lower part of the generator through a conduit 29, the liquid heat exchanger 16, and a conduit 30, which may be provided with cooling fins, into the previously mentioned gas conduit 26. The weak solution flows along the lower part of the conduit 26 and overflows through a conduit 31 into the upper part of the absorber 13. Enriched solution, formed in the absorber 13, flows from the lower part of the absorber through a conduit 32, the liquid heat exchanger 16, and the thermosyphon conduit 17, in which latter the solution is raised into the upper part of the generator 10 by thermosyphon action, as known in the art.

In the above described operation of the illustrated refrigeration system, the flow of weak solution in the gas conduit 26, whereby the weak solution and weak gas are brought into contact prior to entry of the weak solution into the absorber 13 and subsequent to the flow of weak gas through the conduit 25, is in accordance with our invention. The conduit 25 is formed as a loop or coil of an appreciable length, having one or a plurality of turns, and provided with heat radiation fins 33 for direct cooling by air. The conduit 26 is provided with heat radiation fins 34 which are also for the purpose of cooling by direct heat transfer to atmosphere. The lower part of the conduit 26 is provided internally with a plurality of small weirs or baffles 38 to detain the weak solution, flowing through conduit 26, in pools or bodies of extended surface for substantial contact with the gas flowing through the upper part of the conduit 26. Suitable capillary material such as steel mesh may be substituted for the baffles 38 to cause adequate distribution of the liquid in contact with the gas.

The purpose of the finned conduit 25 is to provide for cooling of the weak gas leaving the upper part of the absorber 13 before it enters the conduit 26 in its path of flow back to the evaporator 12 as previously described. The very weak absorption liquid flowing along the lower part of conduit 26 absorbs a further quantity of ammonia out of the weak gas flowing in the upper part of conduit 26, and the fins 34 on the conduit 26 are for the purpose of dissipating the resulting heat of solution. The fact that this further absorption occurs in conduit 26 is due to the lower temperature of this conduit, which lower temperature is afforded both by the cooling of the weak gas in the conduit 25, and the greater conduction of heat from the conduit 26 as compared to the conduction of heat from the absorber 13.

It will now be understood that the conduit 26 constitutes a second absorber in which liquid flowing toward the first absorber 13 is brought into contact with gas flowing from the first absorber 13, this gas and liquid contact occurring at a lower temperature than that of the first absorber 13 and while the gas and liquid are flowing in the preferable countercurrent relation. The further absorption of refrigerant vapor out of the weak gas in the second absorber, conduit 26, may be referred to as "stripping" of the weak gas.

In the embodiment of our invention illustrated in Fig. 2, all of the parts which are identical with those previously described in connection with Fig. 1 are indicated by the same reference numerals. All of the parts are identical with the exception of a jacket 35 which is provided around the weak gas conduit 26, or second absorber, replacing the previously mentioned heat radiation fins 34. This jacket 35 is connected by means of conduits 36 and 37 between the outer passage 23 of the gas heat exchanger 19 and the lower part of the absorber 13. The jacket 35 and conduits 36 and 37 take the place of the conduit 24 mentioned in connection with Fig. 1, and conduct rich gas in its path of flow to the absorber. We thus provide a further heat exchanger in which the heat of solution in the conduit 26, or second absorber, is transferred to raise the temperature of the rich gas toward the temperature in the first absorber 13, toward which latter the rich gas is flowing.

Various other changes and modifications within the scope of our invention will be apparent to those skilled in the art, wherefore our invention is not limited to that which is shown in the drawing or described in the specification but only as indicated in the following claims.

What we claim is:

1. In an absorption refrigeration system, an absorber, a generator interconnected with said absorber for circulation of liquid therebetween, an evaporator interconnected with said absorber for circulation of gas therebetween, means for cooling gas flowing from said absorber out of contact with absorption liquid, means for conducting liquid flowing to said absorber in contact with the gas after passage of the gas through said cooling means, and means for conducting gas flowing to said absorber in thermal exchange relation with said gas and liquid contact means.

2. In an absorption refrigeration system including an absorber, a generator interconnected with said absorber for circulation of liquid therebetween and an evaporator interconnected with said absorber for circulation of gas therebetween, means comprising a finned conduit for cooling gas flowing from said absorber out of contact with absorption liquid, a conduit for conducting liquid flowing to said absorber in contact with the gas after passage of the gas through said cooling means, and a jacket around said second conduit connected to conduct gas flowing to said absorber in thermal exchange relation with said second conduit.

3. In an absorption refrigeration system including an absorber, a generator interconnected with said absorber for circulation of liquid therebetween and an evaporator interconnected with said absorber for circulation of gas therebetween, a finned pipe coil for conducting gas flowing from said absorber out of contact with absorption liquid, a second absorber for conducting liquid flowing to said first absorber in contact with the gas after passage of the gas through said pipe coil, and means for conducting gas flowing to said first absorber in thermal exchange relation with said second absorber.

4. In an absorption refrigeration system including an air cooled absorber, a generator interconnected with said absorber for circulation of liquid therebetween and an evaporator interconnected with said absorber for circulation of gas therebetween, air cooled means for conducting gas flowing from said absorber out of contact with absorption liquid, means including a second absorber for conducting liquid flowing to said first absorber in contact with the gas after passage of the gas through said air cooled means, and means for conducting gas flowing to said first absorber in thermal exchange relation with said second absorber.

5. In an absorption refrigeration system, a generator, an evaporator, means for conducting absorption liquid from said generator and gas from said evaporator in mutual contact at a plurality of places of absorption in series, means for cooling the gas out of contact with absorption liquid in its path of flow intermediate said places of absorption, and means for conducting gas from said evaporator, prior to contact with the absorption liquid, in thermal exchange relation with one of said places of absorption.

6. In an absorption refrigeration system, a generator, an evaporator, means for conducting absorption liquid from said generator and gas from said evaporator in counterflow and mutual contact at a plurality of places of absorption in series, means for cooling the gas out of contact with absorption liquid in its path of flow intermediate said places of absorption, and means for conducting gas from said evaporator, prior to contact with the absorption liquid, in thermal exchange relation with the first of said places of absorption with reference to the direction of liquid flow.

7. In an absorption refrigeration system, a generator, an evaporator, air cooled means for conducting absorption liquid from said generator and gas from said evaporator in counterflow and mutual contact at a plurality of places of absorption in series, air cooled means for conducting the gas out of contact with absorption liquid in its path of flow intermediate said places of absorption, and means for conducting gas from said evaporator, prior to contact with the absorption liquid, in thermal exchange relation with one of said places of absorption.

8. In an absorption refrigeration system, a generator, an evaporator, means including a plurality of absorbers in series for conducting absorption liquid from said generator and gas from said evaporator in counterflow and mutual contact, means for cooling the gas out of contact with absorption liquid in its path of flow intermediate said absorbers, and said system including means for conducting gas from said evaporator, prior to contact with the absorption liquid, in thermal exchange relation with one of said absorbers.

9. In a method of refrigeration with an absorption system which includes distilling refrigerant fluid from solution in an absorption liquid and evaporating the distilled fluid into an inert gas, that improvement which consists in conducting the gas mixture produced by said evaporation into contact with absorption liquid weakened by said distillation and at a plurality of places, in series respectively, to cause absorption of the refrigerant fluid out of the gas mixture into the absorption liquid, cooling the gas out of contact with absorption liquid intermediate said places of contact, and conducting said gas mixture, prior to said contact with absorption liquid, in thermal exchange relation with the gas and liquid at one of said places of contact.

10. In a method of refrigeration with an absorption system which includes distilling refrigerant fluid from solution in an absorption liquid and evaporating the distilled fluid into an inert gas, that improvement which consists in conducting the gas mixture produced by said evaporation in counterflow and contact with absorption liquid weakened by said distillation and at a plurality of places, in series respectively, to cause absorption of the refrigerant fluid out of the gas mixture into the absorption liquid, conducting the gas intermediate said places of contact out of contact with absorption liquid in an extensive path in thermal transfer relation with air, and conducting said gas mixture, prior to said contact with absorption liquid, in thermal exchange relation with the gas and liquid at one of said places of contact 11. In a method of refrigeration with an absorption system which includes distilling refrigerant fluid from solution in an absorption liquid and evaporating the distilled fluid into an inert gas, that improvement which consists in conducting the gas mixture produced by said evaporation in counterflow and contact with absorption liquid weakened by said distillation and at a plurality of places, in series respectively, to cause absorption of the refrigerant fluid out of the gas mixture into the absorption liquid, cooling the gas intermediate said places of contact out of contact with absorption liquid by heat transfer to atmosphere, and conducting said gas mixture, prior to said contact with absorption liquid, in thermal exchange relation with the gas and liquid at the first of said places of contact with reference to the direction of flow of the liquid.

12. In a method of refrigeration with an absorption system which includes circulating inert gas between an absorber and an evaporator, evaporating refrigerant fluid into the gas in said evaporator, and absorbing the refrigerant fluid out of the gas into absorption liquid in said absorber, that improvement which consists in conducting absorption liquid to said absorber in simultaneous contact and heat exchange relation respectively with gas flowing from said absorber and gas flowing to said absorber.

13. In a method of refrigeration with an absorption system which includes circulating inert gas between an absorber and an evaporator, evaporating refrigerant fluid into the gas in said evaporator, and absorbing the refrigerant fluid out of the gas into absorption liquid in said absorber, that improvement which consists in conducting absorption liquid to said absorber in simultaneous contact and heat exchange relation respectively with gas flowing from said absorber and gas flowing to said absorber, and cooling the gas flowing from said absorber out of contact with absorption liquid and prior to said first contact.

14. In a method of refrigeration with an absorption system which includes circulating inert gas between an absorber and an evaporator, evaporating refrigerant fluid into the gas in said evaporator, and absorbing the refrigerant fluid out of the gas into absorption liquid in said absorber, that improvement which consists in conducting absorption liquid to said absorber in simultaneous contact and heat exchange relation respectively with gas flowing from said absorber and gas flowing to said absorber, and cooling the gas flowing from said absorber out of contact with absorption liquid and prior to said first contact by heat transfer to atmosphere.

15. In a method of refrigeration with an absorption system which includes the step of flowing a mixture of inert gas and refrigerant vapor in contact with an absorption liquid, that improvement which consists in carrying out said step in such manner that the absorption liquid first comes into contact with mixture containing the least amount of refrigerant vapor and the mixture first comes into contact with absorption liquid containing the greatest amount of absorbed refrigerant, and performing a further step of conducting the mixture out of contact with liquid in a path intermediate said places of first contact and reducing the temperature of the mixture in said path materially below the temperature at which it leaves liquid contact in order to effect greater absorption in that part of said first step in which the weakest mixture flows in contact with the absorption liquid.

16. In an absorption refrigeration system in which a mixture of inert gas and refrigerant vapor is flowed in contact with an absorption liquid in such manner that the absorption liquid first comes into contact with mixture containing the least amount of refrigerant vapor and the mixture first comes into contact with absorption liquid containing the greatest amount of absorbed refrigerant, means for conducting the mixture out of contact with liquid in a path intermediate said places of first contact, and means for reducing the temperature of the mixture in said path materially below the temperature at which it leaves liquid contact in order to effect greater absorption in that part of the system in which the weakest mixture flows in contact with the absorption liquid.

WILHELM GEORG KÖGEL.
NILS ERIK WIDELL.